United States Patent [19]

Soula et al.

[11] Patent Number: 5,667,702

[45] Date of Patent: Sep. 16, 1997

[54] PROCESS AND GASEOUS MIXTURE FOR ARC WELDING OF ALUMINIUM COMPONENTS

[75] Inventors: Richard Soula, Vertou; Didier Marchand, Saint-Germain-en-Laye; Henri Diot, Saint-Ouen-l'Aumone, all of France

[73] Assignee: L'Air Liquide, Societe Anonyme pour l'Etude et l'Exploitation des Procedes Georges Claude, Paris Cedex, France

[21] Appl. No.: 706,452

[22] Filed: Sep. 4, 1996

[30] Foreign Application Priority Data

Sep. 8, 1995 [FR] France .................... 95 10519

[51] Int. Cl.$^6$ .................... B23K 9/167
[52] U.S. Cl. .................... 219/75; 219/137 WM
[58] Field of Search .................... 219/75, 74, 137 WM

[56] References Cited

U.S. PATENT DOCUMENTS

| | | | |
|---|---|---|---|
| 2,859,329 | 11/1958 | Lesnewich | 219/74 |
| 3,470,346 | 9/1969 | Duboz | 219/74 |
| 3,496,323 | 2/1970 | Lesnewich et al. | 219/74 |
| 4,857,692 | 8/1989 | Larson et al. | 219/74 |
| 4,973,822 | 11/1990 | Evans et al. | 219/74 |
| 5,083,002 | 1/1992 | Hoback et al. | 219/74 |
| 5,210,388 | 5/1993 | Farwer | 219/74 |

FOREIGN PATENT DOCUMENTS

| | | |
|---|---|---|
| 0 502 318 | 9/1992 | European Pat. Off. |
| 0 639 423 | 2/1995 | European Pat. Off. |
| 40 28 074 | 1/1992 | Germany |
| 40 07 673 | 9/1992 | Germany |
| 43 27 672 | 12/1994 | Germany |

*Primary Examiner*—Clifford C. Shaw
*Attorney, Agent, or Firm*—Young & Thompson

[57] ABSTRACT

The arc welding, with a refractory electrode, using alternating current, is performed with a gaseous protective mixture employing, at the location of the weld, at least 60%, typically between 70 and 80% of helium and more than 1000 vpm, typically between 1100 and 1200 vpm, of carbon dioxide, the remainder being argon.

Application to manual or automatic welding of aluminium components.

3 Claims, No Drawings

PROCESS AND GASEOUS MIXTURE FOR ARC WELDING OF ALUMINIUM COMPONENTS

The present invention relates to arc welding with a refractory electrode (TIG welding, for Tungsten Inert Gas) of components made of aluminium and of aluminium alloy and more particularly to a gaseous protective mixture for welding of this type.

It is known that, because of the tendency for layers of alumina $Al_2O_3$ to form on the surface of articles made of aluminium, these layers, which are insulating, interfere with the TIG welding of aluminium components. To destroy this layer of alumina it is possible to employ the arc torch with alternating current, the tungsten electrode being thus alternately receptive (so-called reverse polarity), the flow of electrons escaping from the aluminium component and cracking and dispersing the alumina layer, and then emissive (direct polarity), the flow of electrons bombarding the component and providing the weld penetration. In this latter case the electrode is cold, whereas when it is receptive (anode) it becomes hot under the effect of the flow of electrons, which explains why the switching from the reverse polarity to the direct polarity is easy, whereas the reversal from direct polarity to reverse polarity can be tricky, the weld pool being less emissive than the tungsten electrode. This phenomenon may be aggravated by the presence of helium in the welding gas. In contrast to argon, helium does not promote gas ionization, and this can result in the appearance of brief breaks in the arc or of instability, this being more pronounced when the percentage of helium is high. In manual welding the welder is then obliged to compensate by remaining momentarily on the spot, the rate of welding being reduced thereby. In automatic welding the instabilities may cause irregularities in the penetration, resulting in rejection or reworking of welded components. It is understood that, while the addition of helium intrinsically improves the performance of TIG welding of aluminium components, essentially an increase in the depth of penetration and better compactness via a higher arc voltage and a hotter pool, in practice the helium contents in the mixtures for TIG welding of aluminium components do not exceed a few tens per cent, a content reaching 50% being exceptional, as is recalled by the work "Welding Aluminum: Theory and Practice" published by The Aluminum Association, second edition, June 1991, page 6.3, left-hand column, or the document EP-A-0.639.423, which additionally describes the addition of low contents of carbon dioxide or of oxygen to the argon-based welding gas in order to improve appreciably the arc stability and to ensure better heat transfer towards the weld pool.

The objective of the present invention is to propose a new gaseous mixture for alternating-current TIG welding of components made of aluminium or of an aluminium alloy making it possible to exploit fully the beneficial effects of a high helium content where the welding performance and the bead compactness are concerned, without affecting the arc stability.

To do this, according to a characteristic of the invention, a gaseous mixture is employed at the location of the weld, including at least 60% of helium, more than 1000, and typically less than 1500 vpm, of carbon dioxide ($CO_2$), the remainder being argon.

According to a particular characteristic of the invention the helium content is between 70 and 80% and the $CO_2$ content between 1100 and 1200 vpm.

The Applicant Company has found, in fact, that, in contrast to the teaching of the abovementioned document EP-A-0.639.423, which in the example of TIG welding describes a gaseous mixture devoid of helium, the stabilizing role of $CO_2$ is actually advantageous only in the case of high helium contents, in the case of which the arc breaks appear in a significant manner.

Thus, with a mixture including:
80% He
1100 vpm $CO_2$
remainder argon,
in alternating-current TIG welding, joints are produced over a depth of 5 mm of components made of alloys of aluminium and of magnesium in one run with a current of only 90 amperes. Weld compactness and mechanical characteristics are good and there is no visible deterioration of the electrode.

$CO_2$ contents which can reach 0.5%, or even nearly 1%, may be employed with the same stabilizing effect in an annular nozzle which sheaths the gaseous protective flow axial to the electrode, this axial flow consisting of a predominant helium/$CO_2$-free argon mixture.

Although the present invention may have been described in relation to particular embodiments, it is not, nevertheless, limited thereby but is, on the contrary, open to modifications and alternative forms which will become apparent to a person skilled in the art. In particular, oxygen could be employed instead of $CO_2$, but in still smaller quantities, which would make the packaging of the gaseous mixture tricky and costly.

What is claimed is:

1. Process for alternating-current arc welding with a refractory electrode of components made of aluminium or of an aluminium alloy, employing, at the location of the weld, a gaseous protective mixture including at least 60% of helium and more than 1000 vpm of carbon dioxide, the remainder being argon.

2. Process according to claim 1, characterized in that a gaseous protective mixture is employed containing approximately between 70 and 80% of helium and between 1100 and 1200 vpm of carbon dioxide.

3. Gaseous mixture for arc welding with a refractory electrode and under alternating current of components made of aluminium or of aluminium alloy, characterized in that it includes between 60% and 80% of helium and between 1100 and 1200 vpm of carbon dioxide, the remainder being argon.

* * * * *